Patented May 22, 1951

2,554,249

UNITED STATES PATENT OFFICE 2,554,249

IMPROVED INSECTICIDAL COMPOSITIONS CONTAINING CALCIUM N-ALKYL PHTHALAMIDATES

Mark L. Hill, Yeadon, Troy L. Cantrell, Lansdowne, and Herschel G. Smith, Wallingford, Pa., assignors to Gulf Oil Corporation, Pittsburgh, Pa., a corporation of Pennsylvania No Drawing. Application September 25, 1947, Serial No. 776,162

18 Claims. (Cl. 167—24)

This invention relates to improved insecticidal compositions containing calcium n-alkyl phthalamidates, and more particularly, to insecticidal compositions which are stabilized and benefited by the inclusion therein of certain additives.

The compounding and use of modern insecticidal compositions is complicated by a variety of difficulties which are presented by even the most carefully compounded insecticides. Of these difficulties, one of the most serious is that of deterioration which, of course, is almost inevitably accompanied by a loss of killing power. Many insecticides tend to deteriorate upon aging, and frequently such aging is accompanied by the formation of haziness in the composition followed by precipitation of some of the toxic ingredients or decomposition products thereof. In addition, the deterioration of many insecticides, particularly those comprised of pyrethrins or halogen containing compounds, such as DDT, is noticeably hastened by exposure to the action of light rays and by oxidation. Furthermore, such action operates to increase the corrosive tendency of the insecticide, this tendency being a serious problem in itself.

As desirable as it is to alleviate the above difficulties, it is equally desirable to increase the killing power of the toxicants used in insecticides. This is sometimes accomplished by means of appropriate additives termed synergists. The phenomenon of synergism is well known in the art, and, although the exact mechanism of the synergistic effects of many compounds is not fully known, the use of synergists is widely practiced. It is also desirable to prolong the killing power of an insecticide after it has been applied.

Accordingly, this invention has as an object the provision of insecticidal compositions of enhanced killing power.

A further object is to provide compositions containing compounds capable of synergizing the killing properties of insecticidal toxicants.

A still further object is to provide insecticidal compositions which will exhibit improved binding properties and which will deposit a residual insecticide having increased surface action and prolonged toxicity against insects.

Another object is to provide insecticidal compositions which are stabilized against the reduction of killing power due to aging or the subjection to light rays, and against dehalogenation.

Another object is to provide compositions of the character described which will have a reduced hazing tendency.

A further object is to provide insecticidal compositions which have been stabilized against corrosive tendencies.

These and other objects are accomplished by the present invention wherein we provide insecticidal compositions comprising one or more insecticide toxicants, a solvent therefor, and a substantially neutral calcium salt of N-alkyl phthalamidic acid, or, as designated herein, a calcium N-alkyl phthalamidate.

The calcium N-alkyl phthalamidates used in accordance with our invention have the following formula:

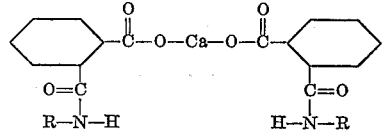

wherein R represents an alkyl group containing from 8 to 20 carbon atoms.

Calcium N-alkyl phthalamidates can readily be prepared from lime (calcium hydroxide), phthalic anhydride and primary alkyl amines, advantageously amines having the following generic formula:

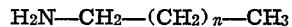

wherein $n$ is a number between 6 and 18. Primary alkyl amines of this generic class include capryl amine, decyl amine, lauryl amine, myristyl amine, cetyl amine, stearyl amine, eicosyl amine and the like. Any one of the amines of the general formula may be used with advantage, but mixtures of such amines tend to yield somewhat better products. For instance, one commercially available mixture of such amines is the so-called "cocoamine" prepared by converting the mixed acids of coconut oil into the corresponding amines by well known methods. The commercial cocoamine has an average molecular weight of about 200–210 and contains a major proportion of lauryl amine with minor proportions of the homologues thereof.

In preparing the calcium N-alkyl phthalamidates, the primary alkyl amine, phthalic anhydride and lime are mixed and reacted together. By way of example, a preferred compound was prepared by reacting 105 grams of cocoamine, 74 grams of phthalic anhydride, and 19 grams of lime in 600 grams of a refined deodorized naphtha of the kerosene boiling range. The lime and phthalic anhydride were admixed with the naphtha and the mixture stirred until they were dispersed and suspended in the naphtha. While continuing the stirring, the cocoamine was then gradually added, whereupon an exothermic reaction occurred and the temperature rose to 120° F. After the reaction mixture cooled to room temperature, the stirring was continued for one hour. The viscous product so obtained was then heated to 320° F. to complete the reaction and remove the water by-product. The dehydrated material, while still hot and fluid, was filtered to remove any insoluble matter and then cooled to room temperature, yielding a clear, bright, solution free of haze and having a good color. The resulting compound was readily incorporated in mineral naphtha base insecticides.

The deodorized naphtha which was used to prepare the above calcium N-coco phthalamidate concentrate, and which may also be used as a solvent in insecticidal compositions, had the following properties:

| | |
|---|---|
| Gravity, °API | 51 |
| Flash, TCC, °F | 154 |
| Cloud, °F | −42 |
| Color, Saybolt | +30 |
| Acid heat, °F | 1 |
| Aniline pt., °F | 175 |
| Distillation, ASTM D86–40: | |
| Over point, °F | 377 |
| End point, °F | 487 |
| 10% | 394 |
| 50% | 420 |
| 90% | 464 |

Other hydrocarbon solvents which may advantageously be used in accordance with the present invention, both as a solvent in the preparation of the calcium N-alkyl phthalamidates and as a solvent for the insecticide composition, include lubricating oils of light viscosity, and aromatic hydrocarbons, such as benzene, toluene and alkyl naphthalenes such as alpha-methyl naphthalene. Other suitable solvents include acetone and alcohol. For compositions adapted for the purpose of treating animals to repel and kill insects, such as a livestock oil spray, a petroleum fraction of the following properties is effective:

| | |
|---|---|
| Gravity, °API | 38.2 |
| Viscosity, SUV, 100° F | 45.0 |
| Flash, OC, °F | 280 |
| Fire, OC, °F | 310 |
| Pour, °F | −120 |
| Unsulfonated residue | 95.0 |
| Distillation, ASTM D447–41: | |
| Over point, °F | 534 |
| 10%, °F | 555 |
| 50% | 584 |
| 90% | 671 |
| 95% | 695 |

The stability of any insecticide toxicant is enhanced by the calcium N-alkyl phthalamidates in accordance with our invention. Thus, various insecticide toxicants, such as pyrethrins, DDT and other halogenated hydrocarbon toxicants, organic thiocyano compounds, as well as mixtures thereof, may be employed in the insecticidal compositions of our invention.

This invention is further illustrated by the compositions in Table I wherein there are compared a kerosene base DDT insecticide before and after the addition of a small amount of calcium N-coco phthalamidate. The active ingredients are expressed in grams per 100 cc. of final solution. The fly killing test, Gulf Method 223, is set forth in detail in U. S. Patent 2,421,223.

Table I

| Composition | I | II |
|---|---|---|
| DDT, gms./100 cc | 5.0 | 5.0 |
| Calcium N-Coco Phthalamidate, gms./100 cc | | 0.15 |
| Deodorized Kerosene to make per cent by volume | 100 | 100 |
| Inspection: | | |
| Gravity, °API | 40.1 | 40.1 |
| Corrosion Test, ASTM D665–44T, Water, 140° F., 48 Hr.: | | |
| Steel Rod, Appearance | rusted | [1] bright |
| Area Rusted, per cent | 100 | nil |
| Fly Killing Test, Method 223, Gulf Average Tests: | | |
| Killed, 24 Hr., per cent | 96 | 97 |
| Difference between kill of sample and Official Test Insecticide (NAIDM) [2] | +48 | +49 |

[1] This corrosion test was continued for 35 days. The rod was bright, without any rust spots at the end of the test.
[2] National Association of Insecticide and Disinfectant Manufacturers, Inc., New York, N. Y.

It is usual to expect heavy corrosion of metals from DDT solutions, accompanied by the dehalogenation of the DDT and formation of hydrogen chloride. Solutions of 5 grams per 100 cc. of DDT in deodorized kerosene usually form rust on polished steel strips when the strips are immersed in the insecticide at 122° F. The addition of 0.15 grams per 100 cc. of calcium N-coco phthalamidate, or 0.45 per cent by volume of the concentrate prepared as described above, stabilizes the insecticide against corrosive action to the steel strip for more than 50 days at 122° F. A comparison between the tests performed on compositions I and II of Table I further reveals that the killing power is not adversely affected (if anything it is increased) by the additive, while corrosiveness is eliminated.

Beneficial results may also be obtained when calcium N-coco phathalamidate is added to pyrethrum extracts and/or pyrethrum extracts containing DDT. A comparison of such compositions before and after the addition of the phthalamidate is presented in Table II.

Table II

| Composition | III | IV | V | VI |
|---|---|---|---|---|
| Pyrethrum Extract, 100 mg. Pyrethrins in 100 cc. of Solution | 100.0 | 100.0 | 100.0 | 100.0 |
| DDT, gms./100 cc | | 5.0 | | 5.0 |
| Calcium N-coco Phthalamidate, gms./100 cc | | | 1.0 | 0.15 |
| Inspection: | | | | |
| Gravity, °API | 50.2 | 49.6 | 49.7 | 49.6 |
| Corrosion Test, ASTM D665–44T, Water, 140° F., 1,200 Hr.: | | | | |
| Steel Rod: Appearance | slight rust | rusted | bright | bright |
| Area Rusted, Per Cent | 10 | 100 | nil | nil |
| Fly Killing Test, Method 223, Gulf Average Tests: | | | | |
| Killed, 24 Hr., per cent | 48 | 96 | [1] 70 | 96 |
| Difference between Kill of Sample and Official Test Insecticide | | +48 | [1] +22 | +48 |

[1] Another run gave a kill of 83 which is +35 better than the Official Test Insecticide.

Comparing the results of tests performed on compositions III and V, it is to be noted that the calcium N-coco phthalamidate not only decreases the corrosiveness of pyrethrum containing insecticides, but, in addition, exerts a pronounced synergistic effect upon the toxic pyrethrins therein. A similar comparison of compositions IV and VI illustrates further the corrosion protection afforded by a small quantity of calcium N-coco phthalamidate, even though two corrosive toxicants, namely DDT and pyrethrins, are present in an insecticide.

The calcium salt of an N-alkyl phthalamidic acid also acts as a synergist when used in combination with organic thiocyano toxicants alone or with other toxicants. Thus, good results may be obtained by incorporating small proportions of a calcium N-alkyl phthalamidate in a composition comprising thiocyano derivatives, such as beta-butoxy, beta-thiocyanodiethyl ether, thiocyano ethers of the higher fatty acids, thiocyano-isobornyl acetate, thiocyano-fenchyl acetate, and the like, as shown in Table III.

*Table III*

| Composition | VII | VIII | IX | X |
|---|---|---|---|---|
| Gravity, °API | 41.0 | 40.8 | 41.2 | 41.1 |
| Corrosion Test, ASTM D665-46T, Water, 140° F., 1,200 Hr.: | | | | |
| Steel Rod, Appearance | rusted | bright | rusted | bright |
| Area Rusted, per cent | 100 | nil | 100 | nil |
| Fly Killing Test, Method 223, Gulf Average Test: | | | | |
| Killed, 24 Hr., per cent | 70 | 80 | 72 | 84 |
| Difference between Kill of Sample and Official Test Insecticide | +22 | +31 | +24 | +34 |

In the above table, composition VII contains 2.5 per cent by weight of beta-butoxy beta thiocyano diethyl ether in a deodorized naphtha. Composition VIII is the same as composition VII, except it contains in addition 2.5 per cent by weight of calcium N-coco phthalamidate. Composition IX contains 2.5 per cent by weight of thiocyano-isobornyl acetate in deodorized naphtha. Composition X is the same as composition IX, except it contains in addition 0.5 per cent by weight of calcium N-coco phthalamidate.

In addition to the enhanced killing power and lessened corrosion tendency produced by the addition of small portions of the agent described above to insecticidal compositions, other desirable qualities are imparted to such compositions. These include improved aging characteristics, increased life of halogen containing toxicants by minimizing the dehalogenation thereof, improved resistance to deterioration by light and oxidation, and the prevention of hazing and precipitation of the toxic ingredients. In general, the calcium N-alkyl phthalamidates stabilize insecticides against deterioration.

Whereas, for most purposes small proportions of the calcium N-alkyl phthalamidates, say from 0.001 to 5.0 per cent by weight of the composition are sufficient, relatively larger quantities, e. g., from 5 to 10 per cent by weight of the finished product, may advantageously be used. Such larger quantities give a binding property to the insecticide which increases the surface action of the residual insecticide after evaporation of the solvent and prolongs the toxic life of the insecticide against most of the common insects. When used on iron screen wire for example, the insecticide compositions of our invention give increased protection against rusting of the iron, and increased surface poisoning action against insects by the insecticide toxicant remaining on the surface. In fact, insecticide compositions of this type may be used successfully in lieu of the usual screen varnishes for protection against rusting, and at the same time carry sufficient residual toxicant on the surface of the screen wire to assist in reducing the insect population of the treated area.

The DDT referred to hereinabove is bis-2,2- dichlorodiphenyl-1,1,1 trichloroethane. Other halogen containing compounds with which calcium N-alkyl phthalamidates may effectively be used, include the hydrocarbon chloride $C_{10}H_6Cl_8$ known as chlordane or 1,2,4,5,6,7,8,8-octachlor-4,7-methano-3-alpha, 4,7,7-alpha-tetrahydroindane, gamma hexachloro cyclohexane, dichloro diphenyl dichloroethane, and bis-2-difluoro diphenyl-1,1,1-trichloroethane.

The above description and specific examples are intended to be illustrative of the invention only, and many different embodiments may be made without departing from the spirit and scope thereof.

What we claim is:

1. An insecticidal composition comprising at least one insecticide toxicant selected from the group consisting of pyrethrins, halogenated hydrocarbon insecticide toxicants, organic thiocyano insecticide toxicants and mixtures thereof, a solvent therefor, and a substantially neutral calcium salt of a phthalamidic acid, said salt having the formula:

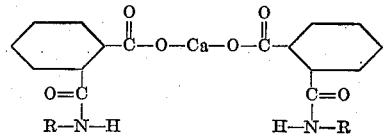

wherein R represents an alkyl group containing from 8 to 20 carbon atoms.

2. An insecticidal composition comprising a halogenated hydrocarbon insecticide toxicant, a solvent therefor, and a substantially neutral calcium salt of a phthalamidic acid, said salt having the formula:

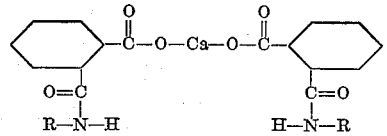

wherein R represents an alkyl group containing from 8 to 20 carbon atoms.

3. An insecticidal composition comprising an organic thiocyano insecticide toxicant, a solvent therefor, and a substantially neutral calcium salt of a phthalamidic acid, said salt having the formula:

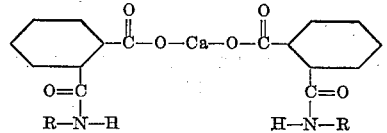

wherein R represents an alkyl group containing from 8 to 20 carbon atoms.

4. An insecticidal composition comprising a pyrethrin insecticide toxicant, a solvent therefor, and a substantially neutral calcium salt of a phthalamidic acid, said salt having the formula:

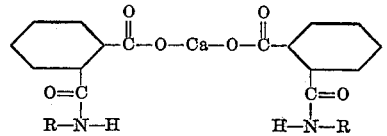

wherein R represents an alkyl group containing from 8 to 20 carbon atoms.

5. An insecticidal composition comprising at least one insecticide toxicant selected from the group consisting of pyrethrins, halogenated hydrocarbon insecticide toxicants, organic thiocyano insecticide toxicants and mixtures thereof, a hydrocarbon solvent therefor, and a substantially neutral calcium salt of a phthalamidic acid, said salt having the formula:

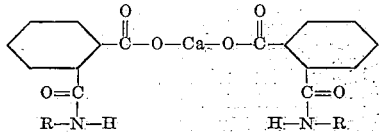

wherein R represents an alkyl group containing from 8 to 20 carbon atoms.

6. An insecticidal composition comprising the toxicants bis -2,2 - dichlorodiphenyl - 1,1,1 trichloroethane and pyrethrins, a hydrocarbon solvent therefor, and a substantially neutral calcium salt of a phthalamidic acid, said salt having the formula:

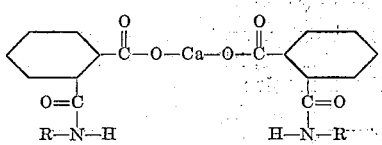

wherein R represents an alkyl group containing from 8 to 20 carbon atoms.

7. An insecticidal composition comprising the toxicants bis-2,2-dichlorodiphenyl-1,1,1-trichloroethane and an organic thiocyano insecticide toxicant, a hydrocarbon solvent therefor, and a substantially neutral calcium salt of a phythalamidic acid, said salt having the formula:

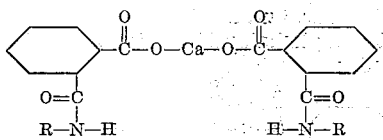

wherein R represents an alkyl group containing from 8 to 20 carbon atoms.

8. An insecticidal composition comprising bis-2,2-dichlorodiphenyl-1,1,1-trichloroethane, a hydrocarbon solvent therefor, and a substantially neutral calcium salt of a phthalamidic acid, said salt having the formula:

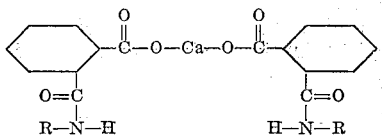

wherein R reperesents an alkyl group containing from 8 to 20 carbon atoms.

9. The composition of claim 2, wherein the salt is calcium N-coco phthalamidate.

10. The composition of claim 3, wherein the salt is calcium N-coco phthalamidate.

11. The composition of claim 4, wherein the salt is calcium N-coco phthalamidate.

12. The composition of claim 6, wherein the salt is calcium N-coco phthalamidate.

13. The composition of claim 7, wherein the salt is calcium N-coco phthalamidate.

14. The composition of claim 8, wherein the salt is a calcium N-coco phthalamidate.

15. An insecticidal composition comprising at least one insecticide toxicant selected from the group consisting of pyrethrins, halogenated hydrocarbon insecticide toxicants, organic thiocyano insecticide toxicants and mixtures thereof, a solvent therefor, and from 0.001 to 10.0 per cent by weight of the composition of a substantially neutral salt of a phthalamidic acid, said salt having the formula:

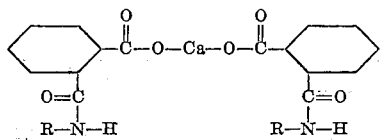

wherein R represents an alkyl group containing from 8 to 20 carbon atoms.

16. An insecticidal composition comprising pyrethrins, a hydrocarbon solvent therefor, and from 0.001 to 5.0 per cent by weight of the composition of calcium N-coco phthalamidate.

17. An insecticidal composition comprising bis-2,2-dichlordiphenyl-1,1,1-trichloroethane, a hydrocarbon solvent therefor, and from 0.001 to 5.0 per cent by weight of the composition of calcium N-coco phthalamidate.

18. An insecticidal composition comprising pyrethrins, bis-2,2-dichlordiphenyl-1,1,1-trichloroethane, a hydrocarbon solvent, and from 0.001 to 5.0 per cent by weight of the composition of calcium N-coco phthalamidate.

MARK L. HILL.
TROY L. CANTRELL.
HERSCHEL G. SMITH.

REFERENCES CITED

The following references are of record in the file of this patent:

UNITED STATES PATENTS

| Number | Name | Date |
| --- | --- | --- |
| 2,101,323 | Salzberg | Dec. 7, 1937 |
| 2,172,689 | O'Kane | Sept. 12, 1939 |
| 2,294,238 | Murphy | Aug. 25, 1942 |
| 2,362,760 | Maxwell | Nov. 14, 1944 |
| 2,378,442 | Smith | June 19, 1945 |

OTHER REFERENCES

Ginsberg: J. Economic Entomology, vol. 28, pages 224–228 (1935).

Goodhue: Committee on Medical Research of the Office of Scientific Research and Development, O. SR. D. Insect Control Committee Report No. 11, Summary of Interim Report No. 1–4. Jan. 19, 1945, OEM cmr-M-4331, Sec. 2, pp. 1–3.

Jones et al.: Soap and Sanitary Chem., Nov. 1945, pp. 110–115.